United States Patent
Wimmer et al.

(10) Patent No.: US 11,368,437 B2
(45) Date of Patent: Jun. 21, 2022

(54) METHOD AND APPARATUS FOR REPERCUSSION-FREE UNIDIRECTIONAL TRANSFER OF DATA TO A REMOTE APPLICATION SERVER

(71) Applicant: SIEMENS MOBILITY GMBH, Bayern (DE)

(72) Inventors: Martin Wimmer, Neubiberg (DE); Rainer Falk, Poing (DE)

(73) Assignee: SIEMENS MOBILITY GMBH, Bayern (DE)

( * ) Notice: Subject to any disclaimer, the term of this patent is extended or adjusted under 35 U.S.C. 154(b) by 107 days.

(21) Appl. No.: 16/621,723

(22) PCT Filed: May 17, 2018

(86) PCT No.: PCT/EP2018/062931
§ 371 (c)(1),
(2) Date: Dec. 12, 2019

(87) PCT Pub. No.: WO2019/007582
PCT Pub. Date: Jan. 10, 2019

(65) Prior Publication Data
US 2020/0120071 A1    Apr. 16, 2020

(30) Foreign Application Priority Data

Jul. 5, 2017 (EP) .................... 17179719

(51) Int. Cl.
*H04L 9/40* (2022.01)
*H04L 69/08* (2022.01)
*H04L 69/165* (2022.01)

(52) U.S. Cl.
CPC ...... *H04L 63/0428* (2013.01); *H04L 63/0209* (2013.01); *H04L 63/164* (2013.01);
(Continued)

(58) Field of Classification Search
CPC ..... H04L 63/0428; H04L 12/22; H04L 12/40; H04L 1/0041; H04L 1/1607;
(Continued)

(56) References Cited

U.S. PATENT DOCUMENTS 6,006,351 A * 12/1999 Peretz .............. H04L 1/0001 714/751
6,798,980 B1 * 9/2004 Seo .................. H04N 5/76 386/232

(Continued)

FOREIGN PATENT DOCUMENTS

| CN | 101384007 A | * | 3/2009 |
| CN | 101753530 A | | 6/2010 |

(Continued)

OTHER PUBLICATIONS

Bhatkalkar, "A Unidirectional Data-flow Model for Cloud Data Security with User Involvement during Data Transit", 2014 (Year: 2014).*

(Continued)

*Primary Examiner* — Nam T Tran
(74) *Attorney, Agent, or Firm* — Schmeiser, Olsen & Watts LLP

(57) ABSTRACT

Provided is a transmission device for feedback-free unidirectional transmission of data from a first network zone into a second network zone for evaluation at a remote application server, containing: a data export device which is arranged in the first network zone and is designed to detect the data transmitted in a network data format in the first network zone and to transform the data from the network data format into a transport data format, a unidirectional data transmission unit, which is designed to transmit the data in the transport data format into the second network zone unidirectionally, a data import device which is designed to transform the data from the transport data format back into (Continued)

the network data format and to transmit the data to an application server, wherein the data import device and the application server are arranged in a second network zone remote from the first zone.

14 Claims, 5 Drawing Sheets

(52) U.S. Cl.
CPC ............ *H04L 63/166* (2013.01); *H04L 69/08* (2013.01); *H04L 69/165* (2013.01)

(58) Field of Classification Search
CPC ............ H04L 63/0209; H04L 12/1482; H04L 12/2836; H04L 1/004; H04L 7/0087; H04L 29/06068; G06F 11/1036; H04W 4/18; H04N 21/4334; H04N 1/0417; H04N 7/0112; H04N 7/01; H04N 11/22; H04N 13/139; H04N 21/2335; H04N 21/2343; H04N 21/234309
USPC .......................................................... 726/26
See application file for complete search history.

(56) References Cited

U.S. PATENT DOCUMENTS

| | | | | |
|---|---|---|---|---|
| 6,894,979 | B1* | 5/2005 | Lee | H04L 43/18 370/241 |
| 7,248,590 | B1* | 7/2007 | Liu | H04L 29/06027 370/395.64 |
| 7,941,526 | B1* | 5/2011 | Hope | H04L 41/069 709/224 |
| 2003/0058274 | A1* | 3/2003 | Hill | H04L 63/0272 715/751 |
| 2004/0186901 | A1* | 9/2004 | Guigui | H04L 41/0893 709/217 |
| 2005/0018655 | A1* | 1/2005 | Bianchi | H04W 88/08 370/352 |
| 2005/0021600 | A1* | 1/2005 | Lagosanto | H04L 29/06 709/203 |
| 2005/0033990 | A1* | 2/2005 | Harvey | H04L 63/105 726/4 |
| 2006/0215707 | A1* | 9/2006 | Tsai | H04N 9/8042 370/535 |
| 2008/0208830 | A1* | 8/2008 | Lauckhart | G06F 16/332 |
| 2011/0072148 | A1* | 3/2011 | Begen | H04L 65/4069 709/231 |
| 2014/0115326 | A1* | 4/2014 | Kim | H04L 63/0407 713/160 |
| 2015/0066366 | A1* | 3/2015 | Pang | G06Q 20/14 701/532 |
| 2015/0163198 | A1* | 6/2015 | Moore | H04L 63/029 726/14 |
| 2015/0215075 | A1* | 7/2015 | Baek | H04L 63/18 726/4 |
| 2015/0271541 | A1* | 9/2015 | Gonder | H04L 65/608 725/134 |
| 2015/0365237 | A1* | 12/2015 | Soffer | G06F 21/82 726/20 |
| 2015/0365378 | A1 | 12/2015 | Kim et al. | |
| 2016/0234348 | A1* | 8/2016 | Mao | H04L 69/08 |
| 2017/0048122 | A1 | 2/2017 | Kerschbaum et al. | |
| 2017/0289616 | A1* | 10/2017 | Igarashi | H04N 21/431 |

FOREIGN PATENT DOCUMENTS

| | | | | |
|---|---|---|---|---|
| CN | 102355409 | A * | 2/2012 | |
| CN | 202679410 | U * | 1/2013 | ......... H04L 63/0209 |
| CN | 104486336 | A | 4/2015 | |
| CN | 105812253 | A | 7/2016 | |
| DE | 60027247 | T2 * | 1/2007 | ............. H04L 12/66 |
| EP | 3092748 | A1 | 11/2016 | |
| EP | 2204034 | B1 * | 4/2019 | ......... H04L 63/0209 |
| KR | 101610715 | B1 | 4/2016 | |
| WO | 9842107 | A1 | 9/1998 | |
| WO | WO 9842107 | A1 | 9/1998 | |
| WO | 2012170485 | A1 | 12/2012 | |
| WO | WO 2012170485 | A1 | 12/2012 | |
| WO | WO2015161871 | | 10/2015 | |

OTHER PUBLICATIONS

Bostan et al., "Unidirectional Data Transfer: A Secure System to Push the Data from a High Security Network to a Lower One over an actual Air-Gap", 2017 (Year: 2017).*
Ginter et al., "Unidirectional Security Gateways: Stronger than Firewalls", 2013 (Year: 2013).*
Heo et al., "A Design of Unidirectional Security Gateway for Enforcement Reliability and Security of Transmission Data in Industrial Control Systems", 2016 (Year: 2016).*
Kim et al., "Design of Unidirectional Security Gateway System for Secure Monitoring of OPC-UA Data", 2017 (Year: 2017).*
Waterfall, "Unidirectional CloudConnect Securely Enabling the Industrial Cloud", 2020 (Year: 2020).*
Waterfall, "Unidirectional Security Gateway WF-500", 2020 (Year: 2020).*
Waterfall, "Certification Report", NSCIB-CC-11-34146-CR, 2012 (Year: 2012).*
Wikipedia, "Unidirectional network", 2021 (Year: 2021).*
Google, "network zone", 2021 (Year: 2021).*
Graupner, "Globus Grid and Firewalls: Issues and Solutions in a Utility Data Center Environment", 2002 (Year: 2002).*
Nag et al., "Method and system for data transformation in a heterogeneous computer system", WO 2003014953 A1, 2003 (Year: 2003).*
Natouri et al., "IMS Threats Taxonomy: Survey and Proposal", 2013 (Year: 2013).*
Onion et al., "Interface device", WO 2002041599A1, 2002 (Year: 2002).*
Xiqun et al., "Traffic Analysis Zone Based Urban Activity Study with Aggregate Mobile Network Data", 2009 (Year: 2009).*
Indian Office Action dated Mar. 12, 2021 for Application No. 201947051299.
Discussion Paper: "How Does a Data Diode Work?", XP055418964, Deep Secure, gefunden im Internet: URL:https://www.deep-secure.com/wp-content/uploads/2017/03/How-does-a-Data-Diode-work.pdf, retrieved Oct. 25, 2017; 2017.
Internet: http://static.waterfall-security.com/Unidirectional-CloudConnect-Brochure.pdf retrieved: Jun. 14, 2017.
PCT International Search Report and Written Opinion of International Searching Authority dated Aug. 14, 2018 corresponding to PCT International Application No. PCT/EP2018/062931 filed May 17, 2018.

* cited by examiner

METHOD AND APPARATUS FOR REPERCUSSION-FREE UNIDIRECTIONAL TRANSFER OF DATA TO A REMOTE APPLICATION SERVER

CROSS-REFERENCE TO RELATED APPLICATIONS

This application claims priority to PCT Application No. PCT/EP2018/062931, having a filing date of May 17, 2018, which is based on European Application No. 17179719.4, having a filing date of Jul. 5, 2017, the entire contents both of which are hereby incorporated by reference.

FIELD OF TECHNOLOGY

The following relates to a method, an apparatus and a computer program product for repercussion-free unidirectional transfer of data from a first network zone to a remote application server in a second network zone for evaluation. In particular, the first network zone is a safety-relevant network, for example a safety network of a railway safety installation or of an automation installation. The second network zone is subject to lower security requirements and may be for example an office network or an evaluation zone connected via an office network or else the Internet, also referred to as a backend zone or cloud.

BACKGROUND

A data diode or one-way gateway is usually supposed to be used to allow a flow of information to be possible only in one direction, in particular between network zones of different security relevance. Cross-zone security solutions of this kind, also called cross-domain security solutions, have been used to date for specific areas in institutional communication that have high security requirements in force and that have a security classification for documents and information. A cross-domain security solution realizes automated secure exchange of documents and messages, such as for example e-mails, between security zones on different levels.

WO 2012/170485 discloses a cross-domain security solution of this kind in which a virtual machine controls the transfer of information between two information domains. However, this requires a specific transmitting component and a specific receiving component in addition to the actual data diode, which means that a communication protocol that is actually bidirectional, such as for example the File Transfer Protocol FTP or the Hypertext Transfer Protocol HTTP, can be realized across a data diode.

U.S. Pat. No. 7,941,526 B1 moreover discloses a specific Syslog daemon provided on a transmitting node, wherein the transmitting node is connected to a receiving node by a unidirectional data connection and the specific Syslog daemon is configured to receive a Syslog message from a Syslog transmitter, to insert a portion of IP information of the Syslog transmitter into the message portion of the received Syslog message and to forward the resulting Syslog message to the one-way data connection, so that the resulting Syslog message can be sent via the unidirectional data connection to a Syslog receiver that is communicatively connected to the receiving node. This resolves the potential conflict between Syslog data transfer applications and unidirectional data transfer applications, which remove IP information from data before the data are transferred via a one-way data connection, resulting in a further improvement in network security by virtue of the combination thereof.

When industrial control networks are coupled to an office network, a public Internet or other control networks, the focus is on repercussion-free transfer. To this end, conventional firewalls are usually used, which restrict the bidirectional data communication according to configurable filter rules. However, such solutions do not guarantee freedom from repercussions, or do not guarantee it to the requisite level required for industrial control networks. Freedom from repercussions in this context means that transfer from a network zone having high security relevance to a less secure network zone does not introduce any kind of data into the security-relevant network zone.

The Waterfall company has revealed a unidirectional cloud connect box. This solution comprises a unidirectional data diode having a transmitting unit and a receiving unit that supports an extremely wide variety of network protocols of the security-relevant network zone, both at the receiving end of the security-relevant zone and on a receiving unit forwarding data to the less security-relevant second network zone.

For network protocols that are used in security-relevant network zones, there is usually a need to perform safety certification to demonstrate functional safety. The result of this is that network components having such protocol implementations can be changed only by means of fresh certification. New protocol implementations or other protocols can therefore be introduced on such components scarcely or only with high levels of effort and cost. On the other hand, evaluation services that make different demands on the input data are performed ever more frequently in a central network zone that is remote from the safety-relevant network zone, the central network zone also being referred to as a cloud or backend zone.

SUMMARY

An aspect relates to an inexpensive and flexibly adaptable solution for repercussion-free, unidirectional transfer of data that is suitable both for data-diode-based cross-domain security solutions and for repercussion-free unidirectional data gateway solutions for industrial areas of application.

In accordance with a first aspect, embodiments of the invention relates to a method for repercussion-free unidirectional transfer of data from a first network zone to a second network zone for evaluation in a remote application server, having the method steps cited as follows: capturing the data, which are transferred in a network data format, in the first network zone, transforming the data from the network data format into a transport data format and unidirectionally transferring the data in the transport data format to the second network zone, transforming back the data from the transport data format and transmitting the data to an application server, wherein the transforming back is performed in a second network zone that is physically remote from the first network zone.

The method allows an inexpensive and flexibly adaptable solution for data-diode-based cross-domain security solutions and for repercussion-free unidirectional gateway solutions for industrial control networks, since the data diode itself does not comprise a conversion apparatus that firstly requires clearance for use in direct contact with the first security-relevant network zone. It is therefore also possible for uncertified and unapproved versions of the network protocol to be used for data import, the versions being able to be updated without restriction. Secondly, it is therefore possible to use cheaply available data diodes or one-way gateways, e.g. what is known as a data capture unit, a network tap or a network switch with port mirroring, in order to realize a repercussion-free one-way transfer instead of having to use very expensive hardware data diodes adapted for specific fields of application and security networks and also network protocols.

In an advantageous embodiment, the transforming of the network data from a network data format into a transport data format involves a protocol format conversion from a network protocol used for transferring the network data in the first network zone into a transport protocol used for transferring the network data to the second network zone being performed. The network protocol supports a bidirectional communication, while the transport protocol supports only a unidirectional communication.

This has the advantage that no kind of data are produced and sent by the transfer via a data diode back to the first network zone. This ensures and improves the freedom of the data diode from repercussions. Freedom from repercussions in this case denotes when no kind of message data or other "contamination bits" are introduced into the first network zone by the transfer of the transport data to the second network zone.

In an advantageous embodiment, information pertaining to the network protocol used is introduced into the transport data format.

The transport data format therefore comprises sufficient information about the network protocol to allow a back-transformation solely from this information. This achieves decoupling of the data transfer between the first network zone and the unidirectional transfer of the data to the second network zone and the evaluation of the data in a second remote network zone.

In an advantageous embodiment, the transforming involves the data being redundantly coded and/or error recognition codes being added to the data.

This reduces the risk of an erroneous or incomplete transfer of the data to the second network zone.

In an advantageous embodiment, the data are cryptographically protected during the transforming, in particular a cryptographic checksum is added and/or the data are encrypted.

An applicable cryptographic checksum and/or the encrypting of the data during transformation from the network data format into the transport data format mean(s) that the data are already protected from manipulation when they are transferred via a unidirectional transfer unit. In the event of unauthorized eavesdropping on or branching-off the data in the transport data format by an attacker, the attacker cannot read the data in plain text or manipulate the data unnoticed.

In an advantageous embodiment, a cryptographically secure communication connection is used for transferring the data in the transport data format in the second network zone.

By way of example, the data in the transport data format are transferred within the second network zone via a communication connection in accordance with the transport layout security protocol TLS. Such a communication connection is set up by a data gateway that is separate from a unidirectional transfer apparatus, in order to avoid an obligation for certification and clearance. This allows in particular realization of the security protocol to be updated (patched) promptly if weaknesses become known. The data in the transport data format are therefore transferred as useful data to an application server, that is to say a web service, using a conventional network protocol. This means that the solution is highly compatible with existing backend technologies. Instead of or in addition to the transport layer security protocol TLS, it is also possible to use other or further security protocols for transferring the data in the transport data format via a communication connection within the second network zone, e.g. IPsec/IKEv2, S/MIME, Cryptographic Message Syntax (CMS), JSON Web Encryption (JWE), JSON Web Signature (JWS).

A second aspect of embodiments of the present invention relates to a transfer apparatus for repercussion-free unidirectional transfer of data from a first network zone to a second network zone for evaluation in a remote application server, having the following components: a data export device, which is arranged in the first network zone and which is designed to capture the data transferred in a network data format in the first network zone, and to transform the data from the network data format into a transport data format, a unidirectional data transfer unit, which is designed to unidirectionally transfer the data in the transport data format to the second network zone, and a data import device, which is designed to transform the data from the transport data format back into the network data format and to transmit the data to an application server, wherein the data import device and the application server are arranged in a second network zone that is physically remote from the first zone.

The data import device and the application server do not necessarily have to be arranged in a common network zone. They may also be arranged in different network zones that are different from the first network zone. As a result, a less complex and less expensive implementation of a repercussion-free unidirectional data diode for industrial applications and a cross-domain security solution based on a data diode are realizable.

In an advantageous embodiment, the transfer apparatus is designed to carry out the development of the method as claimed in claims 2 to 7.

In an advantageous embodiment, the data import device is designed to carry out at least one further transformation of the data from the network data format into a further data format.

This allows an adaptation of the data format for the evaluation by applications or the application server to be performed in the data import unit itself. The data can therefore be provided flexibly to different applications or application servers.

In an advantageous embodiment, the data import device is in the form of part of the application server.

Besides a data import device that is in a form physically separate from the application server and, within the second network zone, is linked to the first network zone via a public Internet or an office network, for example, the data import device may advantageously also be in a combined form as part of the application server. This reduces the number of components to be operated and hence serviced and can therefore be operated less expensively.

In one advantageous embodiment, the data export device has a memory unit for persistently storing the data in the first network zone.

These data can therefore be collected in a first network zone and for example used as log data for reconstructing the data transfer in the first network zone.

In an advantageous embodiment, a network tap, a mirroring port of a network switch or a data diode is usable as unidirectional data transfer unit. A network tap can also be referred to as a data capturing unit (DCU). The use of a mirroring port of a network switch is also referred to as port mirroring.

These forms of a data transfer unit have particularly good properties in regard to freedom from repercussions.

In an advantageous embodiment, the apparatus additionally comprises a data gateway designed to set up a cryptographically secure communication connection for transferring the data in the transport data format to the data import device.

A third aspect of embodiments of the invention relates to a computer program product (non-transitory computer readable storage medium having instructions, which when executed by a processor, perform actions) directly loadable into a memory of a digital computer and comprising program code portions suitable for performing the steps of the method as claimed in one of claims 1-7.

BRIEF DESCRIPTION

Some of the embodiments will be described in detail, with reference to the following figures, wherein like designations denote like members, wherein.

DETAILED DESCRIPTION

Figure 1:
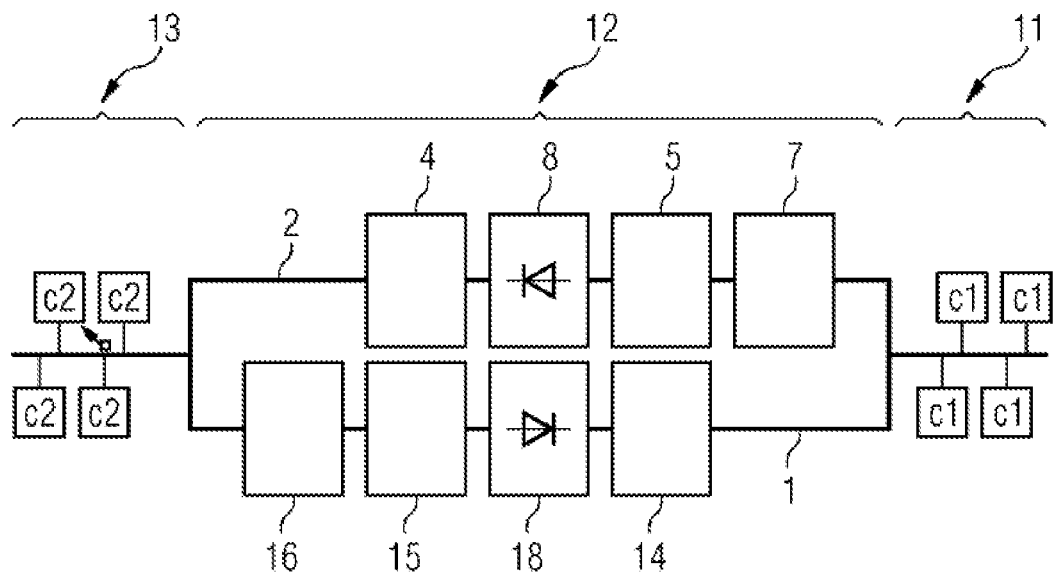
FIG. 1 shows a schematic depiction of a conventional cross-domain security gateway.

FIG. 1 shows a conventional cross-domain security gateway 12 having two one-way communication links 1, 2 on the basis of data diodes 8, 18. The linked network zones 11, 13 are classified differently, which means that firstly a network zone 13 having a low security requirement and, by contrast, a network zone 11 having a high security requirement 11 exist. A data transfer on the one-way communication link 1 from the second network zone 13 having a security classification "internal" is possible in the direction of the first network zone 11 having high security requirements and a classification "Confidential", unless the content of the data is identified as malicious by a virus scanner 16. Use of the data diode 18 requires a bidirectional-to-unidirectional converter 15 for converting a bidirectional communication protocol, for example a Transmission Control Protocol TCP, into a unidirectional communication protocol, for example the User Datagram Protocol UDP, for the transfer via the data diode 18. After the data diode 18, the unidirectional protocol needs to be converted back into a bidirectional communication protocol again by a unidirectional-to-bidirectional protocol converter 14.

In the opposite direction on the one-way communication link 2 from the first network zone 11 to the second network zone 13, a data transfer is possible if data to be transferred or a document to be transferred can be successfully declassified in a declassification apparatus 7, for example from the classification "Confidential" to "Internal" in accordance with prescribed declassification rules. The data are then transformed in a bidirectional-to-unidirectional converter 5 and handed over via the data diode 8 to a unidirectional-to-bidirectional converter 4 and transformed back. The data themselves are sent and received by users C1 in the first network zone 11 and users C2 in the second network zone 13.

Figure 2:
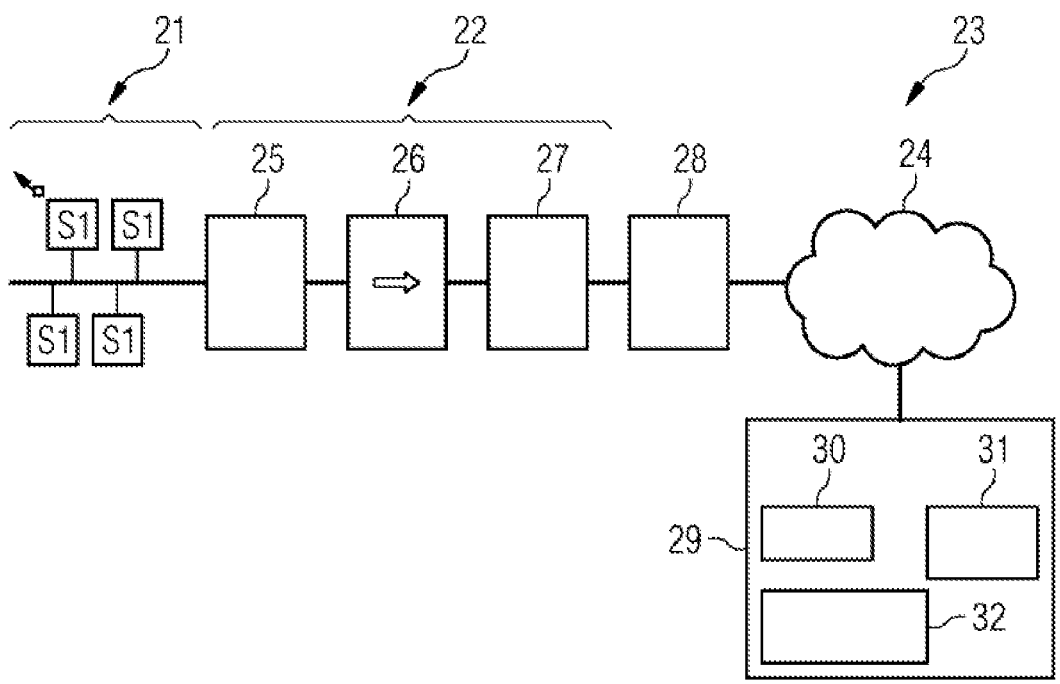
FIG. 2 shows a schematic depiction of a conventional repercussion-free data gateway for control networks.

FIG. 2 now shows a conventional solution by means of a repercussion-free one-way data gateway 22 for repercussion-free unidirectional export of data from a security network, which in the present case corresponds to a first network zone 21, to an application server 29, which is connected via a public network 24, for example an Internet or office network. The public network 24 and the backend application server 29 are therefore in a second network zone 23.

A data transmission device 25 in the first network zone 21 collects diagnosis data from controllers S1, for example, and transfers the current data map, for example as a file or as a binary data object, also called a binary blob, cyclically to a data receiving device 27 via a data transfer unit 26 guaranteeing freedom from repercussions.

The data transmitting device 25 can also be referred to as a one-way data provider or one-way publisher. A data receiving device 27 receives the data transmitted via the unidirectional data transfer unit 26 and can also be referred to as a one-way recipient or one-way subscriber. The data transmitting device 25 comprises a one-way export function in order to provide the stock of data to the data receiving device 27, for example as a binary data object. The data receiving device 27 has an import function in order to import and interpret the received stock of data, and to transfer the included diagnosis data to the application server 29, for example via a data gateway 28. The application server 29 contains application programs 30, 31, 32 for evaluating the transferred data.

Figure 3:
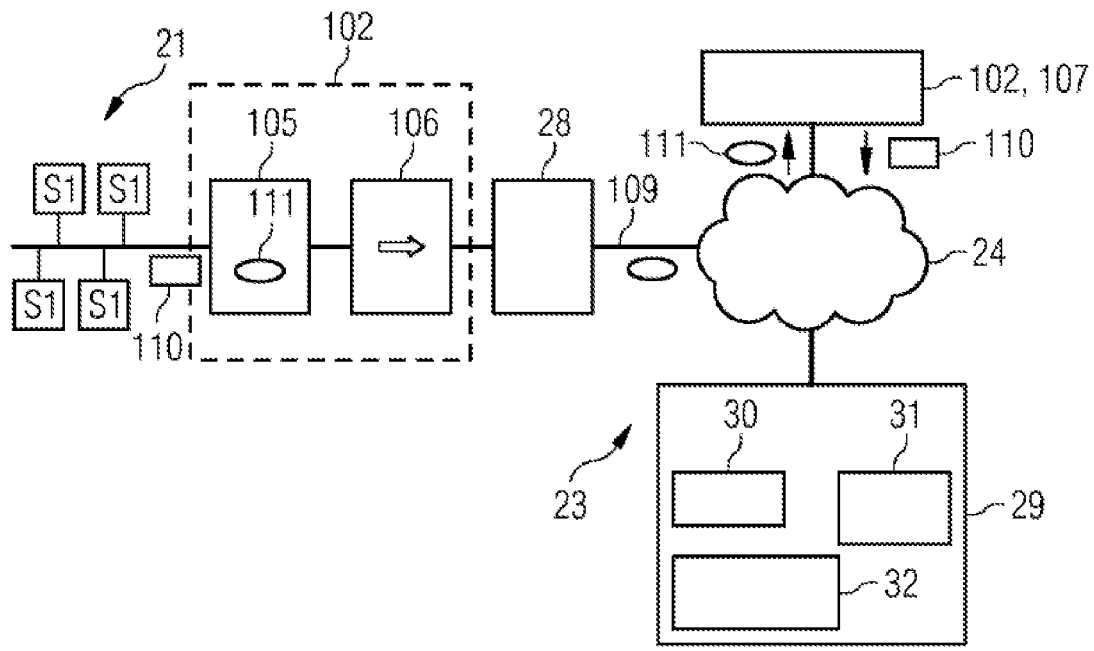
FIG. 3 shows a schematic depiction of a first exemplary embodiment of a transfer apparatus according to embodiments of the invention, in particular for control networks.

FIG. 3 now shows an inventive exemplary embodiment of a repercussion-free data transfer apparatus 102 in an industrial setting in accordance with FIG. 2. In this case, data are supposed to be transferred from users or controllers Si in a first network zone 21 to an application server 29 in a second network zone 23 for evaluation. The transfer is effected within the second network zone 23 via a second gateway 28, for example, and via a public network 24 having low security relevance.

The unidirectional transfer apparatus 102 comprises a data export device 105, a unidirectional data transfer unit 106 and a data import device 107, which is in a form remote from the data export device 105 and from the data transfer unit 106 in the second network zone 23. The data import device 107 is arranged in an application zone, for example, often also referred to as a cloud.

The data to be transferred within the first network zone 21 are stored persistently in the data export device 105, for example in a data memory. The data are transferred within the first network zone 21 via a network connection in accordance with a network protocol. The data are available in a network data format 110. Typical network protocols of the first network zone 21 are for example the OPC Unified Architecture (OPC UA) protocol for transferring machine data or a syslog protocol for transferring log reports.

A data export unit 105 associated with the first network zone now captures the data in the network data format 110 and transforms them into a transport data format 111 in accordance with a transport protocol. This involves the data being converted by a bidirectional network protocol into a transport data format 111 suitable for transfer via the one-way link by the unidirectional data transfer unit 106. This optionally involves not only a protocol format conversion but also the data being redundantly coded, so that correction of transfer errors is rendered possible, and error recognition codes or cryptographic checksums being added, so that transfer errors or manipulation is/are recognizable, and/the data being encrypted.

The transport data format 111 contains information pertaining to the network protocol used in the first network zone 21. This allows the data import device 107 to perform a transformation from the transport data format back to the network data format.

By way of example, a header of a data packet in the transport data format 111 contains metadata containing not only details pertaining to the network protocol but also a time stamp and origin information such as IP address. The data available in the transport data format 111 are divided into smaller partial data packets by the data transfer unit 106 for decoupling. Each partial data packet contains additional metadata such as for example a transfer identifier, a sender identifier, which supports a publish-subscribe function at the receiving end, and a packet number or checksums for detecting transfer errors and/or integrity. These partial data packets are terminated on the output side of the data transfer unit 106 or in the second data gateway 28, the data converted into the transfer data format 111 and are output.

A further data format conversion can be performed in the data import device 107 in order to adapt the data in accordance with the requirements of a downstream evaluation service.

The data format that is output by the data import device 107 can be concordant with the data format in the first network zone 21. However, it is likewise possible for the data format that is output by the data import device 107 to be different from the data format in the first network zone 21. As such, it is e.g. possible for OPC UA to be used as data format in the first network zone 21, whereas the data import device 107 outputs a JSON data format.

In one variant, the data import device 107 outputs the data if the checksum of the associated received data is checkable correctly. In a further variant, the data import device 107 outputs the data together with supplementary information indicating whether the checksum of the associated received data is correct.

The unidirectional data transfer unit 106 then transfers the data in the transport data format 111 and outputs them to a data gateway 28, for example, which sets up a secure connection to the data import unit 107. The secure data connection used can be for example a conventional TLS connection in accordance with the Transport Layer Security Protocol. In this TLS connection, the data remain in the transport data format 111.

The unidirectional data transfer unit 106 may be designed for unidirectional data transfer as a data decoupling device, for example a network tap or a network data capturing unit, via a mirror port of a network switch, which likewise forwards the data applied to the mirror port to an output port in identical fashion, or via a network diode having for example an optical fiber. The unidirectional data transfer unit 106 makes the data available outside the self-contained, security-critical first network zone 21.

Outside the unidirectional data transfer unit 106, the transport data format 111 is, in contrast to the conventional art, not converted back into the network data format 110 but rather transferred onward in the transport data format 111.

In the data import unit 107, the data are transformed from the transfer data format 111 back into the network data format 110 and provided to an evaluation program 30, 31, 32 in an application server 29.

Figure 4:
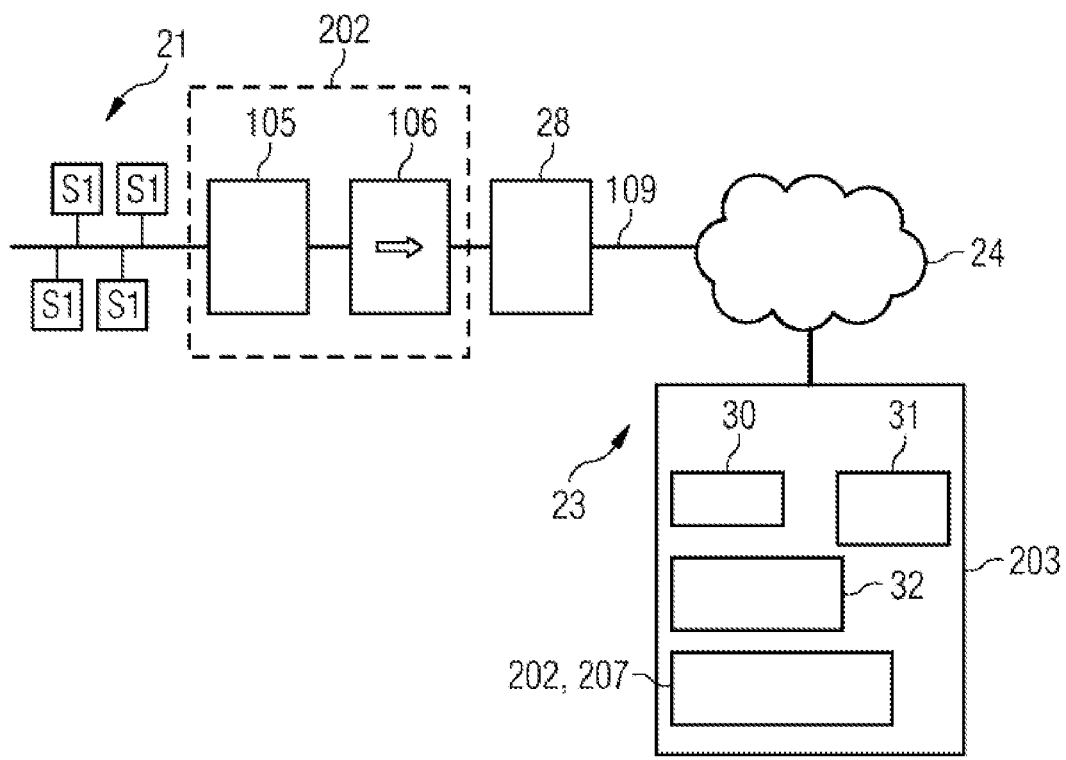
FIG. 4 shows a schematic depiction of a second exemplary embodiment of a transfer apparatus according to the invention having a data import device integrated in an application server.

FIG. 4 shows a further embodiment of a unidirectional transfer apparatus 202 in which the data import device 207 is realized as integrated in an application server 203. The data import device 207 can also be loaded as a cloud application into an application server 203 and executed therein. For such an application server 203, for example an IoT back end, the functionality may be realized in the form of a cloud application.

Figure 5:
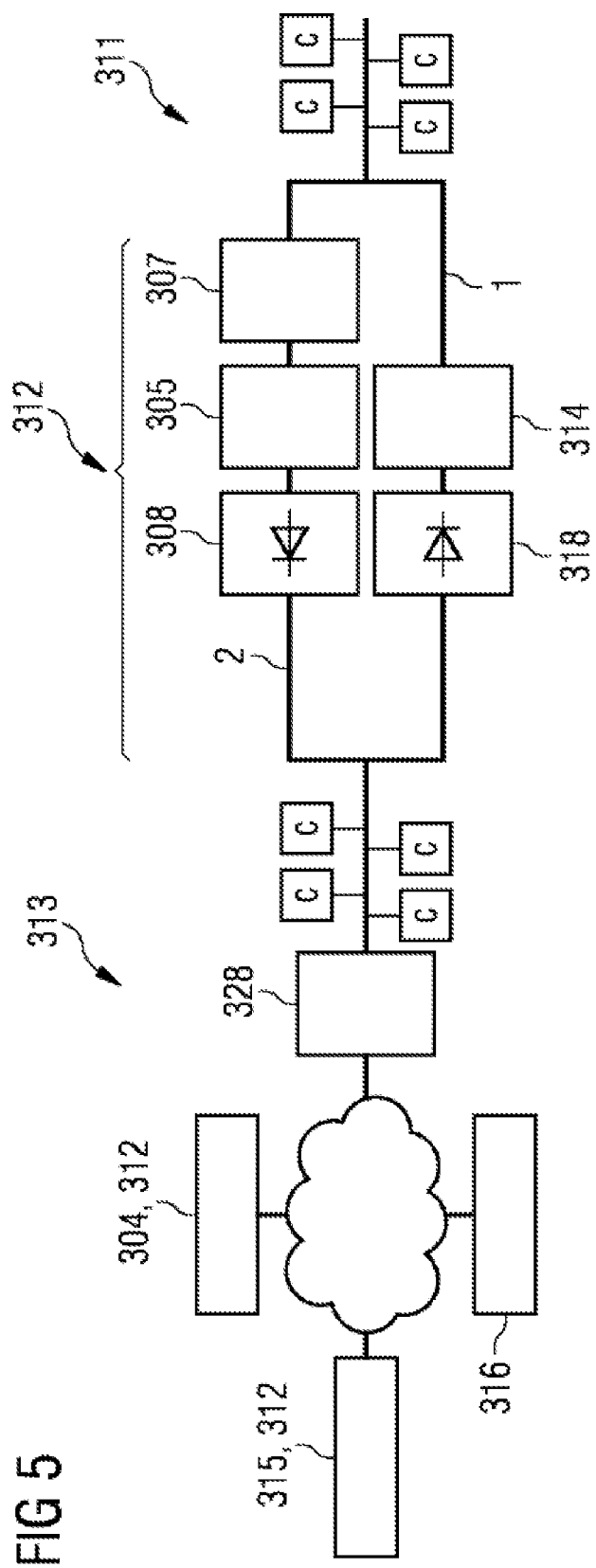
FIG. 5 shows a schematic depiction of a third exemplary embodiment of a transfer apparatus according to the invention, in the form of a cross-domain security gateway.

FIG. 5 shows an embodiment of the unidirectional transfer apparatus 312 in a cross-domain security gateway solution. In the present case, a remote, for example Internet-based, unidirectional-to-bidirectional converter 304 corresponding to the data import device 105 of a unidirectional transfer apparatus 102 is used in the second network zone 313 for a transfer link 2 from the first network zone 311 to the second network zone 313. As in the preceding exemplary embodiments, the unidirectional-to-bidirectional converter 304 is a logical component of the transfer apparatus 312, but one that is in a form physically separate from a bidirectional-to-unidirectional converter 305 and a data diode 308. In a further variant (not depicted), the unidirectionally transferred data are transferred (tunneled) to the Internet-based unidirectional-to-bidirectional converter 304 via a bidirectional data communication connection when transferred to the second network zone 313 via the transfer link 2. To this end, there may be provision for a separate tunneling component (not depicted) arranged between the data diode 308 and the transfer link 2. The tunneling component can transfer e.g. unidirectionally transferred UDP frames via a TCP communication channel or a TLS communication channel.

In the same manner, a bidirectional-to-unidirectional converter 315, corresponding to a data export device 105, is used as remote unit in the second network zone 313 for the transfer link 1 from the second network zone 313 to the first network zone 311. A unidirectional-to-bidirectional converter 304, 312 performs the unidirectional-to-bidirectional conversion 304, 312, and corresponds to a data export device 105 in FIGS. 3 and 4. In the same manner, a virus scanner 316 may be in the form of a network service.

The unidirectional-to-bidirectional converter 304 and bidirectional-to-unidirectional converter 315 are therefore of simpler design, since they now need to perform only a receiving function and a transmitting function, respectively. This allows in particular simple expansion for new protocols or the remedying of weaknesses in protocol stacks used in the unidirectional-to-bidirectional converter 304 and the bidirectional-to-unidirectional converter 315.

In contrast to the conventional art, as is known from cross-domain security solutions on the basis of hardware data diodes, conversion back after the unidirectional transfer is not necessary before the data are transmitted for example to a cloud-based backend system arranged in a second network 313, 413 having a lower security requirement. Instead, the data can be transferred via a conventional network connection to the cloud-based backend system and only there transformed back and transmitted to an application server for evaluation. This allows redundant cloud-based services, for example with automatic failover, to be used in the application server. The implementation of the method by means of a technical implementation of this kind therefore comprises fewer components needing to be serviced and also certified, which means that the solution has a lower level of complexity than conventional methods. As a result, the method and a corresponding apparatus can be integrated into existing infrastructures more cost-efficiently and more easily.

Figure 6:
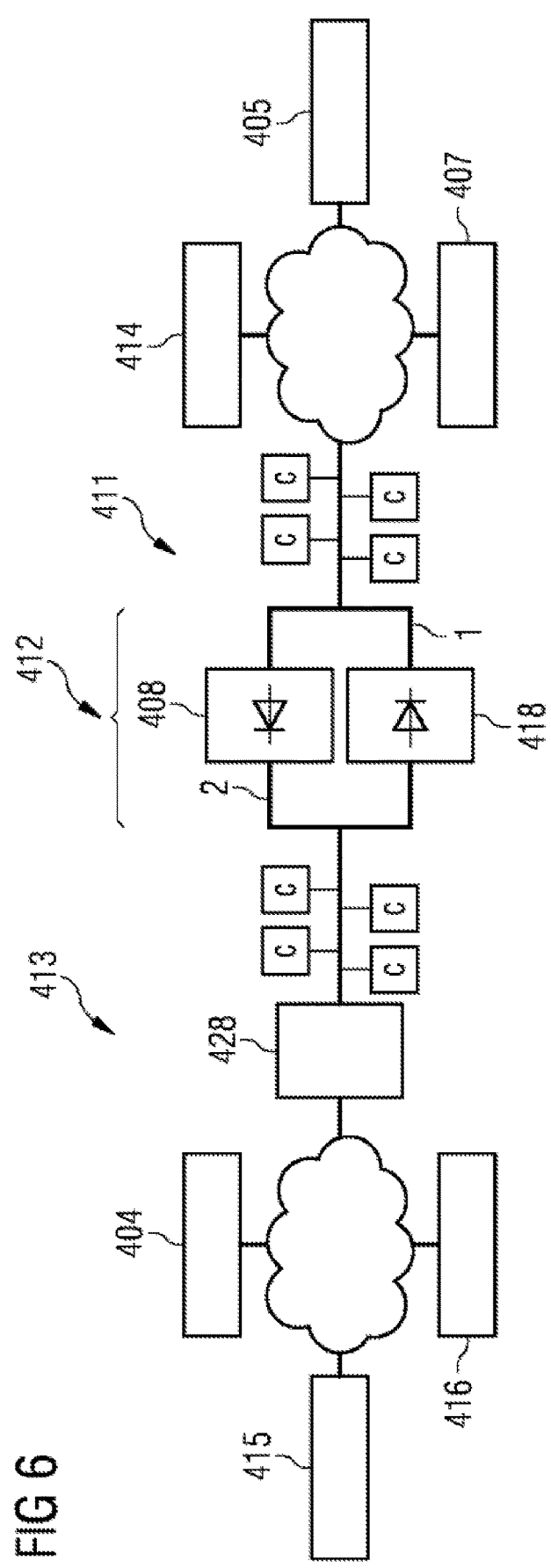
FIG. 6 shows a schematic depiction of a fourth exemplary embodiment of a transfer apparatus according to the invention as a cross-domain security gateway.

FIG. 6 shows a variant in which the unidirectional-to-bidirectional converter 414, corresponding to the integrated unidirectional-to-bidirectional converter 314 in FIG. 5, and the bidirectional-to-unidirectional converter 405, corresponding to the integrated bidirectional-to-unidirectional converter 305 in FIG. 5, are implemented in the first network zone 403, for example as part of a high-security computing center. In this case too, in a further implementation variant, the data diodes 408, 418 can each have provision for an additional tunneling component that transports, or tunnels, so to speak, the unidirectionally transferred data into a bidirectional communication connection.

Figure 7:
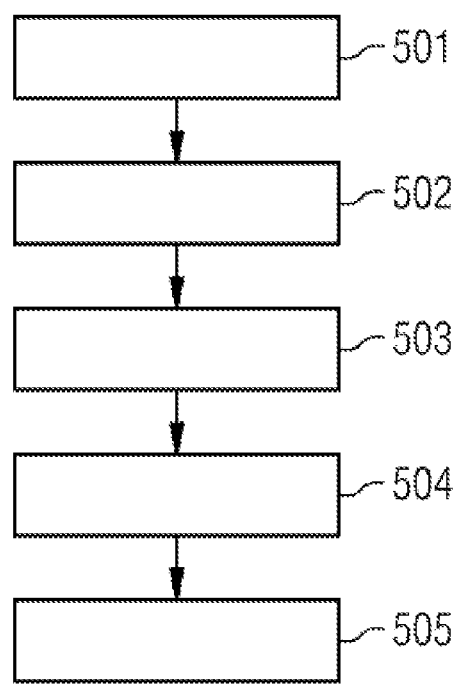
FIG. 7 shows a flowchart for an exemplary embodiment of the method according to the invention.

FIG. 7 shows the individual method steps for repercussion-free unidirectional transfer of data from a first network zone 21, 311, 411 to a remote application server 29, 203, in a second network zone 23, 313, 413, for evaluation. In a first method step 501, the data transferred in a network data format in the first network zone 21, 311, 411 are captured in this first network zone 21, 311, 411. In method step 502, the data are transformed from a network data format to a transport data format, and method step 503 involves them being transferred unidirectionally in the transport data format 111 to the second network zone 23, 313, 413. In the second network zone 23, 313, 413, the data are then transformed 504 from the transport data format back into the network data format. This transforming back is performed in a second network zone that is physically remote from the first network zone, and it transmits the data in the network data format to an application server, see step 505, for evaluation.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for repercussion-free unidirectional transfer of data from a first network zone to a second network zone for evaluation in a remote application server, the method comprising:
   capturing the data, which is transferred in a network data format, in the first network zone;
   transforming the data from the network data format into a transport data format;
   unidirectionally transferring the data in the transport data format to the second network zone;
   transforming the data from the transport data format back into the network data format; and
   transmitting the data to the remote application server,
   wherein the transforming back is formed in a second network zone that is physically remote from the first network zone;
   wherein information pertaining to a network protocol used for transferring the network data in the first network zone is introduced into the transport data format.

2. The method as claimed in claim 1, wherein the transforming of the network data from the network data format into the transport data format involves a protocol format conversion from the network protocol into a transport protocol used for transferring the network data to the second network zone being performed, wherein the network protocol allows a bidirectional communication and the transport protocol allows only a unidirectional communication.

3. The method as claimed in claim 1, wherein the transforming involves the data being redundantly coded and/or error recognition codes being added to the data.

4. The method as claimed in claim 1, wherein the data are cryptographically protected during the transforming by adding a cryptographic checksum and/or encrypting the data.

5. The method as claimed in claim 1, wherein a cryptographically secure communication connection is used for transferring the data in the transport data format in the second network zone.

6. The method as claimed in claim 1, wherein the first network zone is a first network having high security requirements and the second network zone is a second network having low security requirements.

7. A transfer apparatus for repercussion-free unidirectional transfer of data from a first network zone to a second network zone for evaluation in a remote application server, comprising:
   a data export device, which is arranged in the first network zone and which is configured to capture the data transferred in a network data format in the first network zone, and to transform the data from the network data format into a transport data format,
   a unidirectional data transfer unit, which is configured to unidirectionally transfer the data in the transport data format to the second network zone,
   a data import device, which is configured to transform the data from the transport data format back into the network data format, and to transmit the data to the remote application server, wherein the data import device and the remote application server are arranged in a second network zone that is physically remote from the first network zone;
   wherein information pertaining to a network protocol used for transferring the network data in the first network zone is introduced into the transport data format.

8. The apparatus as claimed in claim 7, wherein the apparatus is configured to carry out the method.

9. The apparatus as claimed in claim 7, wherein the data import device is configured to perform at least one further transformation of the data from the network data format into a further data format.

10. The apparatus as claimed in claim 7, wherein the data import device is a part of the remote application server.

11. The apparatus as claimed in claim 7, wherein the data export device has a memory unit for persistently storing the data in the first network zone.

12. The apparatus as claimed in claim 7, wherein a network tap, a mirroring port of a network switch or a data diode is usable as the unidirectional data transfer unit.

13. The apparatus as claimed in claim 7, comprising a data gateway configured to set up a cryptographically secure communication connection for transferring the data in the transport data format, to the data import device.

14. A computer program product, comprising a non-transitory computer readable hardware storage device having computer readable program code stored therein, said program code executable by a processor of a computer system to implement a method for repercussion-free unidirectional transfer of data from a first network zone to a second network zone for evaluation in a remote application server, the method comprising
- capturing the data, which is transferred in a network data format, in the first network zone;
- transforming the data from the network data format into a transport data format;
- unidirectionally transferring the data in the transport data format to the second network zone;
- transforming the data from the transport data format back into the network data format; and
- transmitting the data to the remote application server,
- wherein the transforming back is formed in a second network zone that is physically remote from the first network zone;
- wherein information pertaining to a network protocol used for transferring the network data in the first network zone is introduced into the transport data format.

* * * * *